(12) United States Patent
Chellappa et al.

(10) Patent No.: US 7,979,390 B2
(45) Date of Patent: Jul. 12, 2011

(54) SOFTWARE, SYSTEMS, AND METHODOLOGIES FOR REALIGNMENT OF REMOTE DATABASES BY A CENTRAL DATABASE IN SUPPORT FIELD REPRESENTATIVE TERRITORY ASSIGNMENTS

(75) Inventors: Balaji Chellappa, Stamford, CT (US); Sayee Natarajan, Norwalk, CT (US); Rajeshwara Raghavan, Norwalk, CT (US)

(73) Assignee: Purdue Pharma L.P., Stamford, CT (US)

( * ) Notice: Subject to any disclaimer, the term of this patent is extended or adjusted under 35 U.S.C. 154(b) by 417 days.

(21) Appl. No.: 11/925,610

(22) Filed: Oct. 26, 2007

(65) Prior Publication Data

US 2008/0104134 A1   May 1, 2008

Related U.S. Application Data

(60) Provisional application No. 60/867,945, filed on Nov. 30, 2006, provisional application No. 60/863,243, filed on Oct. 27, 2006.

(51) Int. Cl.
*G06F 17/30* (2006.01)
(52) U.S. Cl. ...................................................... 707/618
(58) Field of Classification Search .................. 707/618
See application file for complete search history.

(56) References Cited

U.S. PATENT DOCUMENTS

| | | | | |
|---|---|---|---|---|
| 6,185,556 | B1 * | 2/2001 | Snodgrass et al. | 707/3 |
| 6,292,801 | B1 * | 9/2001 | Campbell et al. | 707/10 |
| 6,501,770 | B2 * | 12/2002 | Arsenault et al. | 370/477 |
| 6,910,053 | B1 * | 6/2005 | Pauly et al. | 707/203 |
| 2002/0029376 | A1 * | 3/2002 | Ambrose et al. | 717/113 |
| 2002/0072957 | A1 * | 6/2002 | Thompson et al. | 705/10 |
| 2002/0087576 | A1 * | 7/2002 | Geiger et al. | 707/104.1 |
| 2004/0073567 | A1 * | 4/2004 | Pelon | 707/102 |
| 2004/0128227 | A1 * | 7/2004 | Whipple et al. | 705/38 |
| 2005/0021553 | A1 * | 1/2005 | Romijn et al. | 707/102 |
| 2007/0198317 | A1 * | 8/2007 | Harthcryde et al. | 705/8 |
| 2007/0219935 | A1 * | 9/2007 | Surasinghe | 707/1 |

* cited by examiner

*Primary Examiner* — James Trujillo
*Assistant Examiner* — William Spieler
(74) *Attorney, Agent, or Firm* — Leason Ellis LLP

(57) ABSTRACT

A method for realigning a database server and a client database is provided. During realignment at least one table of the database server is copied to a workspace, and a set of records copied to the workspace is identified that are associated with the client. The set of records associated with the client are modified and can include a subset of records newly associated with the client. An association-rule is created that defines the modified set of records as accessible by the client and includes an effective time. The association-rule and the newly associated records are distributed to the client, preferably during database synchronization. At the effective time, the modifications to the workspace records are made effective on the server and activated on the client. Optionally, the association-rule and the newly associated records are distributed in response to receiving approval of the modified set of records.

18 Claims, 3 Drawing Sheets

SOFTWARE, SYSTEMS, AND METHODOLOGIES FOR REALIGNMENT OF REMOTE DATABASES BY A CENTRAL DATABASE IN SUPPORT FIELD REPRESENTATIVE TERRITORY ASSIGNMENTS

This patent application claims the benefit of priority under 35 U.S.C. §119(e) of U.S. Application Ser. No. 60/867,945, filed Nov. 30, 2006, entitled "Data Software, Systems, and Methodologies for Realignment of Remote Databases by a Central Database in Support Field Representative Territory Assignments," and of U.S. Application Ser. No. 60/863,243, filed Oct. 27, 2006, entitled "Territory Management System," which are hereby incorporated by reference in their respective entireties.

FIELD OF THE INVENTION

The present invention relates to the realignment of data on a remote database by a central database server, and, more particularly, to software, systems, and methodologies for controlled redistribution of data and ownership of data from a central database to one or more remote databases in support of modifying field representative territory assignments.

BACKGROUND OF THE INVENTION

In many sectors, field representatives are used to educate customers and potential customers on the products of manufacturers and service providers. In the course of their duties, sales representatives make site visits and build a relationship with the customers and potential customers in their assigned territory. Typically, field representatives are assigned specific customers and maintain records of their visits in accordance with any guidelines or requirements of the companies that they represent. The records of site visits can include details and have formats that vary widely among representatives and the companies they represent. The data collected by field representatives is typically aggregated in a centralized repository such as a database server so that the data can be analyzed. Additionally, the centralized repository commonly redistributes information or provides additional information, such as analysis of the data, to the field representatives. This data collection and distribution is typically performed using a client-database server architecture.

In a typical field-representative environment a field-representative is assigned a number of customers and can therefore see most, if not all, of the data associated with the assigned customers. Occasionally, the customers assigned to a field-representative can change. This change may occur because of the relocation of a field-representative to another geographic location, the relocation of a customer, or a redistribution of customers by a manager to maximize efficiency and effectiveness.

Furthermore, a manager typically has control over all the data assigned to the field-representatives managed by the manager. Thus as the responsibility of the field-representatives change, the data controlled by the representatives' manager must also change. Additionally, promotions and other changes to an organization's structure can result in a change in functional requirements and control of data. The redistribution of data, control of data and functionality is collectively and/or individually referred to as "realignment."

In some environments or fields, this realignment can occur on a quarterly basis, or even more frequently. Because current schemes for realigning data ownership can require client database downtime of several days, each realignment can be very costly for businesses because workflow is impeded. Alternatively, if the client databases and the system are not shutdown, but rather updated while the system is live, data loss and coverage issues can arise. For example, until every client is updated and realigned, a customer may be assigned to multiple field-representatives or no representatives at all.

The present invention addresses these deficiencies in the art and provides other improvements useful to the realignment and redistribution of database records in a client-database server environment.

SUMMARY OF THE INVENTION

In accordance with one aspect of the present invention, a method for realigning a database of a server and a database of a respective client is provided. At least one table of the database server is copied to a workspace having a plurality of records, and a set of records is identified from among the records in the workspace that are associated with the respective client. The set of records associated with the respective client are modified in the workspace such that the modified set of records can include a subset of records newly associated with the respective client. Further, an association-rule is created for the respective client that defines the modified set of records as accessible by the respective client and includes an effective time. The association-rule and the subset of newly associated records are distributed to the respective client, and at the effective time the modifications to the set of records in the workspace are made effective in the database server.

In accordance with a further aspect of the present invention, the association-rule and the newly associated records are distributed in response to receiving approval of the modified set of records. Additionally, the distribution of the association-rule and the newly associated records can occur during synchronization of the client and database servers.

These and other aspects, features, and advantages will be apparent from the following description of certain embodiments and the accompanying drawing figures.

DESCRIPTION OF THE DRAWING FIGURES

DETAILED DESCRIPTION OF CERTAIN EMBODIMENTS

Figure 1:
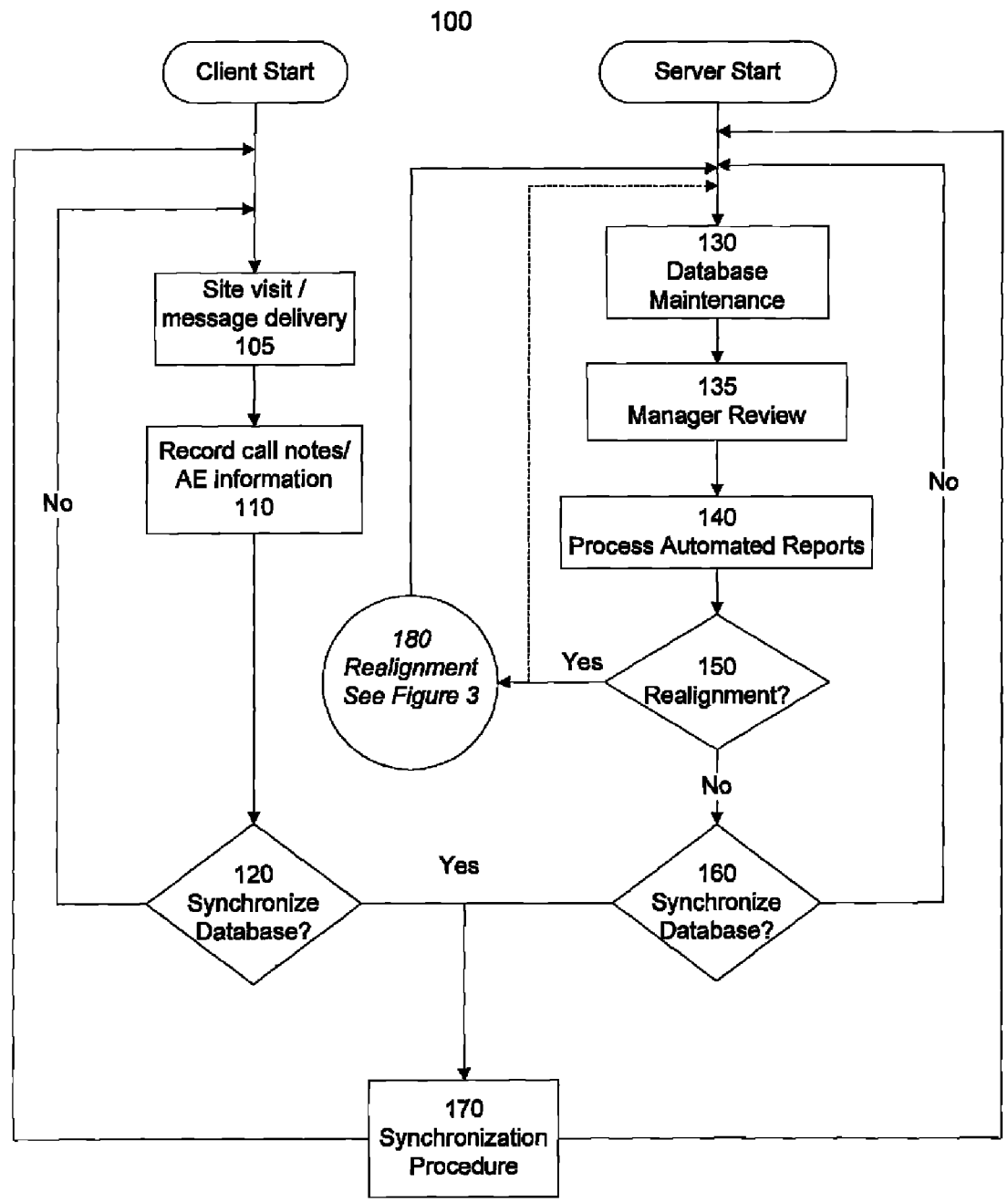
FIG. 1 is a flow diagram illustrating certain steps in accordance with an environment in which the present invention may used, wherein field representatives synchronize their data with information managed on a server.

By way of overview and introduction, the present invention is discussed below with respect to a territory management system that provides representatives with a tool for conducting their activities in an efficient manner. Such a territory management tool typically requires synchronization of a central database with one or more client databases controlled and operated by the field representatives. The client database frequently requires synchronization with information created and stored on the database server, or uploaded to the database server during the synchronization of a different client. Furthermore, as field representatives move, or the organization restructures territory assignments of field representatives, the client databases need to be realigned, preferably in coordination with the database server.

The management system is preferably implemented as a software-based system, having components executing on a number of systems including a central computer and a multiplicity of remote machines, with each representative having a remote machine for his or her personal use and for forwarding adverse event information to a location associated with or accessible by the central computer. Without loss of generality, the present invention is described in relation to a particular representative using a single remote machine in the course of his or her activities covering an assigned territory. In the preferred embodiment described below, the representative is bespoke or contracted to a pharmaceutical manufacturer, and the representative "covers" a territory through visits to health care providers ("HCPs"), physicians and nurses (collectively, more generally, "prescribers") at which the representative is able to discuss and promote the use of the manufacturer's products. However, the invention has industrial applicability in other sectors including in connection with field representative activities in promoting products and services of general nature, including, without limitation, in the medical device sector.

A preferred software tool for territory management is described in part in U.S. provisional application Ser. No. 60/863,243, filed Oct. 27, 2006, the entirety of which is hereby incorporated by reference. The Territory Management System software provides through a Web-browser interface a number of tools that assist the representative in planning, recording, and tracking activities with customers such as prescribers. In relevant part, the Territory Management System software can assist a representative with maintaining up-to-date customer records and functionality relating to servicing his or her assigned territory. The Territory Management System software includes additional features that can assist representatives in other ways, such as in complying with concerning certain regulatory requirements or state or federal constraints concerning expenses related to visits with health care professionals, in reducing discrepancies in sample inventories as between stored and on-hand inventories, and in scheduling site visits to HCPs. Various features of the Territory Management System software are described in certain co-pending provisional patent applications which are referenced below, to the extent they have pertinence to the discussion of the present invention.

The remote machine used by the representative includes a suitable complement of hardware and software including, by way of example, a processor, memory, an accessible database, communications equipment, and input/output devices.

The process 100 illustrated in FIG. 1 concerns activities relating to a pharmaceuticals representative. In the area of pharmaceutical representation, it is common for a representative to drop-in on a prescriber within the representative's assigned territory with the hope that the prescriber will be able to speak with the representative for a few minutes. The nature of such visits can vary from informal to formal, but one objective of the representative is to promote a prescriber's familiarity and understanding of pharmaceuticals that the representative wishes the prescriber to prescribe to patients. In other fields, the representative may have an objective of promoting purchase and use of his or her represented products and services through educational and promotional efforts. The process 100 includes activities by both a sales representative operating a client database (illustrated in the left branch of the flow diagram) and a database server (shown in the right branch). These activities and the data capture described below are brought together, in accordance with a salient aspect of the invention, to transmit and synchronize the data collected by the users with the server and redistribute relevant information back to the client databases.

Thus, at block 105, the representative makes a site visit to a particular prescriber's office. The representative typically makes a number of visits during the course of a day, whether scheduled or drop-in, and these visits can be coordinated through a calendar function provided by the same programmed system that handles the representative's reporting of any expense information. The scheduling and calendar functions form no part of the present invention, but are described in co-pending U.S. Provisional Application Ser. No. U.S. Provisional Application Ser. No. 60/868,015, filed on Nov. 30, 2006, entitled "Cycle Planning Tool for Territory Management" and U.S. Provisional Application Ser. No. 60/868,027, filed on Nov. 30, 2006, entitled "Itinerary Search Tool for Territory Management," which are each hereby incorporated by reference in their respective entireties.

It may be that the prescriber is not available for a conference with the representative, in which case the representative proceeds to a next appointment by traveling to another site within his or her territory, preferably with guidance from a calendared set of appointments that fill the day. If, however, a conference is held with a prescriber at a particular site visit, then the representative is supposed to capture a summary of who was met, what products (services) were discussed, whether samples were provided (and details concerning same), whether any adverse event information was discussed, propose a next meeting and follow-up discussion points, and document any expenses attributable to any prescribers that were visited. This information is captured in a "call note," which, upon entry into his or her machine, is a "call completion" concerning a sales call made at a given date and time. Functionality, systems and methodologies suited to adverse-event data capture, management and reporting are described in co-pending U.S. Provisional Application Ser. No. 60/867,923, filed on Nov. 30, 2006, entitled "Adverse Event Data Capture Software, Systems, And Methodologies" ("AE Capture"), which is hereby incorporated by reference in its entirety. Functionality, systems and methodologies suited to expense capture are described in co-pending U.S. Provisional Application Ser. No. 60/867,906, filed Nov. 30, 2006, entitled "Pharmaceutical Representative Expense Report Management Software, Systems, And Methodologies," which is hereby incorporated by reference in its entirety. All of this information must ultimately be synchronized with the central database.

Representatives generally seek to satisfy any concerns expressed by the customers in their territory, and so follow-up points can be captured in the territory Management software so that the representative can better address those concerns with their customers. Representatives also have obligations to the company they represent to document any expenses attributable to visits to their customers and any adverse events that may have been reported for investigation or follow-up. Again, this information ultimately must be synchronized with the central database.

Use of the territory management system commences then at block 110 at which the representative initiates the entry of visitation notes, known as making a "call completion" because he or she has completed a sales call to the prescriber/customer and has meeting notes to record. The user can initiate this data entry process in a variety of ways. For example, a calendar feature of the management system can present an icon such as a telephone icon for selection which causes a call-notes entry form to be displayed. Alternatively, the calendar feature of the management system can include entries showing the time, location, or both, of the visits for that day which the representative can select to bring up the call-notes entry form. Yet another alternative is that the representative can call up a prescriber summary page which can include a link (or an icon as mentioned above) to enter call notes that are to be associated with that prescriber visit. These features are described in the aforementioned A/E Capture disclosure, and are not described further herein.

At block 110, the user inputs call notes and any adverse information using a suitable data entry form, such as the call-notes entry form described in the aforementioned AE Capture disclosure, which is recorded into the local database on the user's machine.

At step 120, the determination is made whether the database should be synchronized with the server. Synchronization can be initiated in multiple ways. For example, the user can instruct the client computer to synchronize with the database server, synchronization can be scheduled for a particular time or after a specified time interval, or the client database can determine that the certain one or more synchronization criterion have been met, such as a period of inactivity or network connectivity.

If synchronization is not appropriate at 120, the user and the client return to step 105, conceptually, to continue the process of visiting sites. However, if synchronization is initiated, the client proceeds to step 170. Synchronization can be effected through the methodologies and systems know in the art. For example, synchronization is preferably performed using the methodologies and systems of synchronization described in co-pending U.S. Provisional Application Ser. No. 60/867,943, filed Nov. 30, 2006, entitled "Data Cache Techniques in Support of Synchronization of Databases in a Distributed Environment," which is hereby incorporated by reference in its entirety.

While the user is conducting site visits 105 and recording call notes, any adverse event information 110, and other relevant information, the database server can perform maintenance and administrative tasks. For example, database maintenance 130 can include consistency checks, backups, and can re-compute database indices. Additionally, at block 135, manager review of the database can be performed through user interaction or automated algorithmic program code. Additionally, automated reports can be processed at step 140.

At step 160, the database server can receive a request to synchronize with a client database. If no synchronization request is received, the database server continues to perform its administrative tasks as necessary (e.g., steps 130, 135, and 145.) However, if a synchronization request is received, the server proceeds to step 170, at which synchronization is performed in accordance with one of the methodologies identified above.

When the territory of a field representative changes, the client database must be updated to reflect this change. Prior solutions to update the client database required the client database, and frequently the database server, to be shutdown, or at least reduced in functionality. Shutting down any part of the system can result in lost work time, lost revenue, interrupted customer contact, and also have a negative impact on field representatives whose territory has not changed. It is beneficial to enable the field representatives and the database server to continue operating while performing any necessary realignment due to the territory change in the background.

Figure 3:
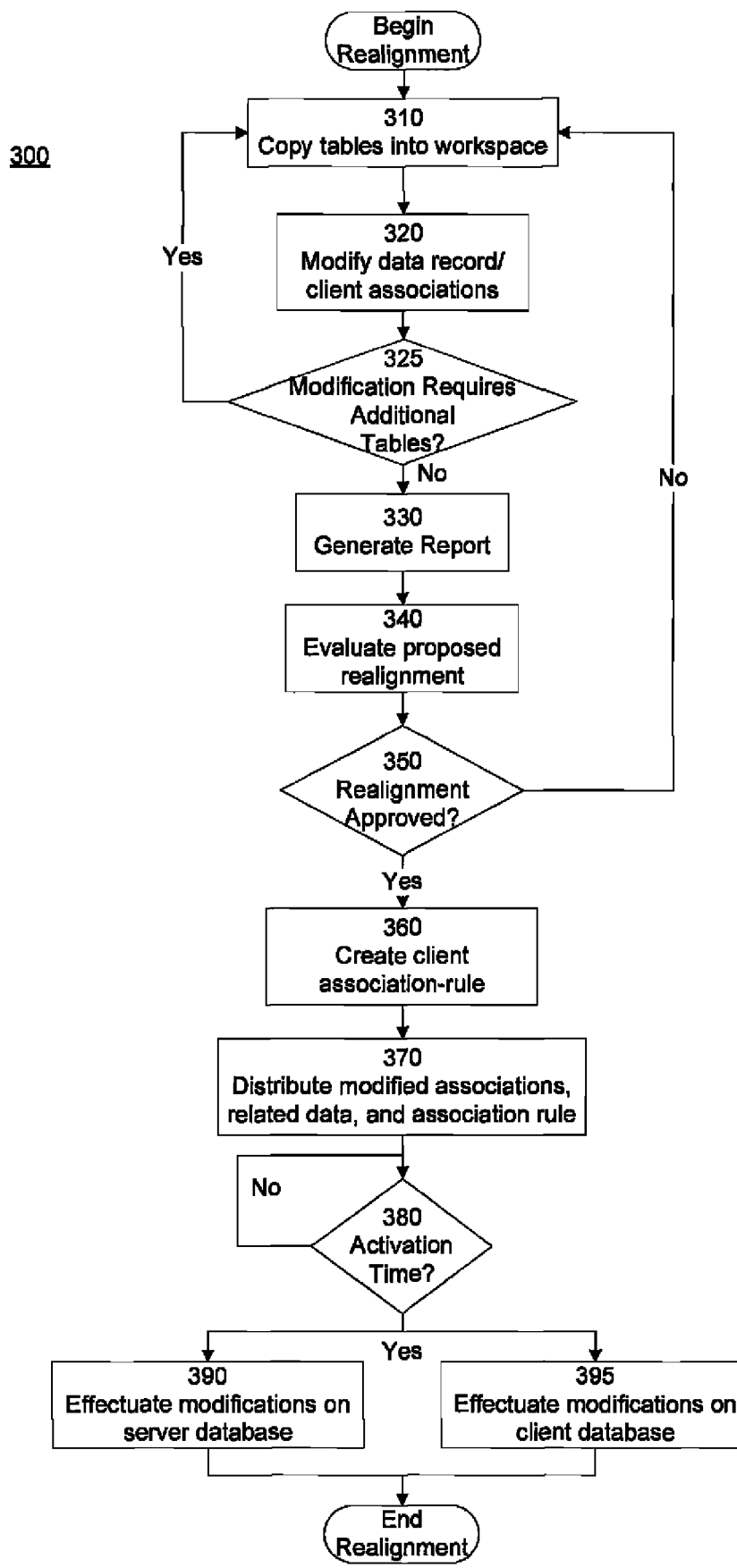
FIG. 3 is a flow diagram illustrating a process of realignment in accordance with a preferred embodiment of the present invention.

Therefore, at step 150, the server can check to determine if realignment is necessary. If it is not, the system proceeds to step 160 as outlined above. However, if realignment is necessary, the server proceeds to step 180, identifying process 300 that is illustrated in FIG. 3. Additionally, as indicated by the broken line connected to box 150, the database server also proceeds to continue its normal operation of database maintenance 130, manager review 135, processing of automated reports 140 and synchronization 170. The realignment process is preferably executed "behind-the-scenes," prior to the effective time of the realignment, and performed so as not to impact the normal operation of the database server.

Furthermore, as illustrated in FIG. 1, the client can be completely unaware of the realignment process. This disregard is possible because all the necessary information for client realignment can be distributed during the synchronization process, optionally, several days before the effective time. Moreover, as described below, the realignment process does not impact the operation and/or functionality of the client database.

Figure 2:
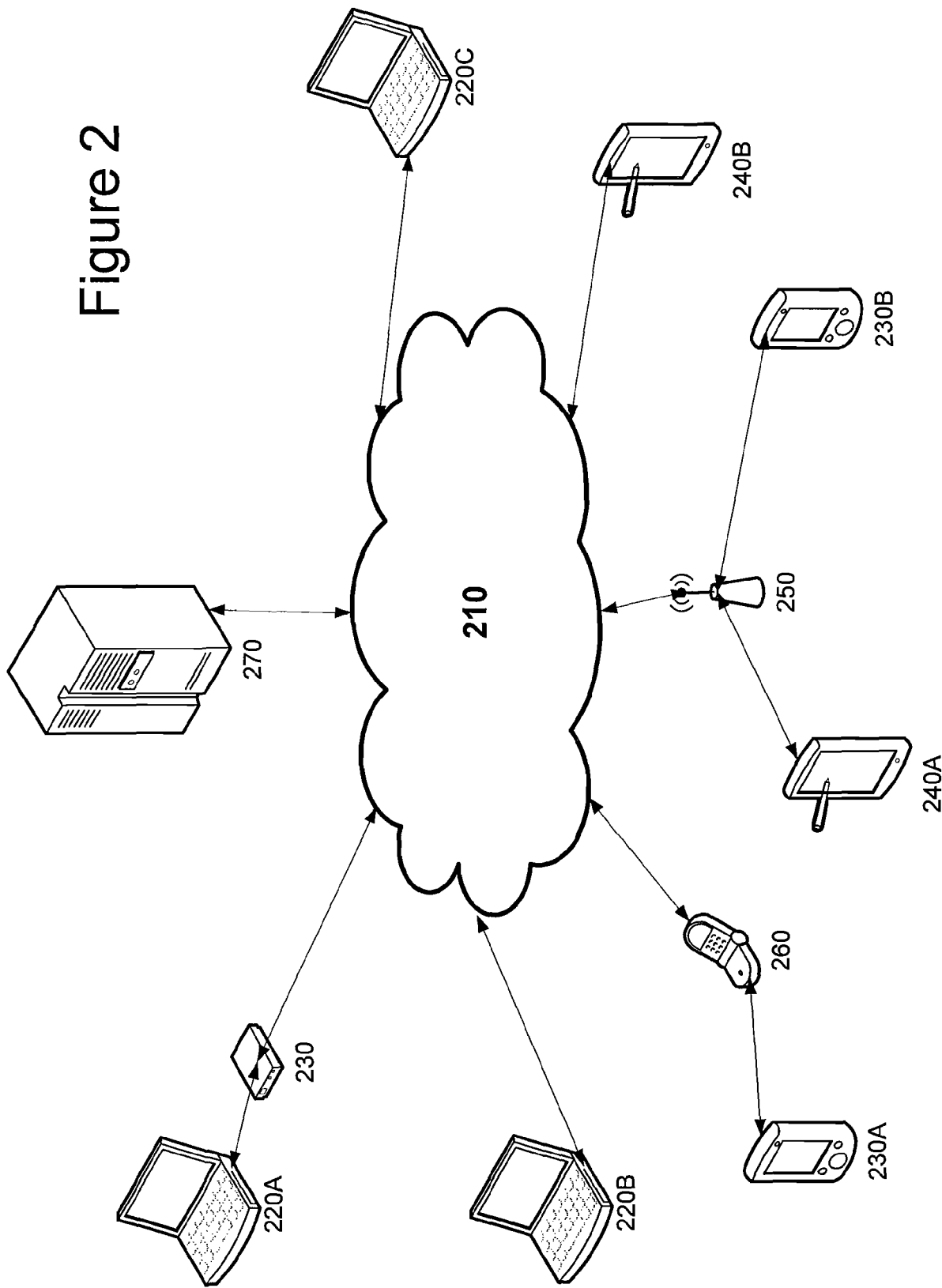
FIG. 2 is illustrates a network environment in which a system implementing an embodiment of the invention can be used.

The realignment of remote databases can be conducted over a heterogeneous network 210 as illustrated in FIG. 2. Multiple clients can connect to server 270 over the network 210 using various means of communication. For example, a laptop 220A can connect to a modem 230 to access the database server 270. Alternatively, laptop 220B can connect to the network over an Ethernet or other broadband connection.

Additionally, a variety of wireless networks can be utilized to facilitate client-server communications and database synchronization and realignment. Laptop 220C and tablet PC 240B can connect via an internal cellular modem or PC Card cellular modem. Tablet PC 240A or Personal Digital Assistant (PDA) 230B can connect to a wireless access point 250 to communicate with server 270. Alternatively, PDA 230A can connect using a wireless standard such as Bluetooth or via a wired link to a cellphone 260 that can communicate over the network 210 with the server 270.

The present invention can be implemented over a client server network as well as a peer-to-peer network. If operated over a peer-to-peer network, multiple databases at each respective client can be realigned and synchronized to account for the data input or modified on the peer clients. However, for the purposes of expediency, in the below discussion, each actor in a network transaction is referred to as a client or a server.

Additionally, it should be noted that FIG. 2 illustrates clients as devices conventionally associated with client-type operations and performance (e.g., laptops, tablet computers, etc.). However, a client can include other communication devices and combinations thereof. For example, a client can be separated into a thin element (e.g., a personal digital assistant (PDA) that acts only as a display) that communicates with a workstation element (e.g., a laptop or other portable computer). Through a configuration such as the one described, a field representative can carry the PDA into a customer's and enter the information on the PDA, which is communicated to the portable computer located in the field representative's car. Alternatively, a computerized medical device can also act as a client that synchronizes and realigns its data with a server.

Each type of connection (e.g., modem, cellular network, broadband, etc. . . . ) and device has its own connection characteristics, such as speed, availability, and reliability. The realignment mechanisms set forth by the present invention can operate over these types of communications links and communication devices, as well as many others.

The process 300 of database realignment in accordance with one embodiment of the present invention is illustrated in FIG. 3. The database server typically includes a set of tables each defining specific data fields and containing data records within each table. Certain tables include data fields that associate a specific record with one or more clients, and specify a period of time during which the record is associated with the clients. During the realignment process these records are modified to change the client-association of the records necessary to effect the change to a field representative's territory.

In order to execute the realignment without interrupting the service and/or availability of the database server, at step 310 the database server tables (or their contents) that require modification are copied into a workspace. The workspace and the copies of the tables (or their contents) created therein, enable the system to modify the records the records "offline" so that the database server tables are consistently accessible by administrators and clients alike. Alternatively rather than copying entire tables into the workspace, a table can be replicated in the workspace by creating a table that is compatible with the database server table, and copying a set of data records into the replicated table. The replicated table can be useful if it is known that only a small subset of field representative's client associations are going to be modified. Then, once the realignment is completed, the changes made to the replicated table can be merged into the database server as discussed below with respect to step 380. Meanwhile, the workspace can be adjusted while manager review and automated reports are generated, if desired, to gauge the appropriateness or fit of the modifications before altering the actual database tables.

At step 320, the field representative-customer associations can be modified. As an example, HCPs in Carson City, Nev. can be realigned with a different representative after the effective time, or various HCPs can be added to the database server and be newly assigned to one or more representatives and thereafter downloaded to the client machines of the respective representatives. The way in which the customer associations are modified is a design choice that is dependent on the database design. For example, modification 320 can require updating the customer records to indicate the new field representative or representatives with which it is associated. Alternatively, field representative data records can be updated to identify a new list of associated customers, or to update the data associated with the representative's modified role (e.g., promotion to manager) that is effective from a future date.

When the tables are copied into the workspace, the modification of field representative and customer associations does not require the implementation of customized tools. Rather, the territory management tool that is already utilized by the field representatives and the supervisors can be directed to the copied tables in the work space, and through the territory management tools, the associations can be modified. Thus, the user has access to all the tools, graphs, reports, data displays, etc. to which he or she is accustomed, while creating the proposed new alignment.

Alternatively, the realignment process can be automated. For example, a manager may desire an alignment in which all the field representatives have a relatively equal distribution of "good customers" and "bad customers" (e.g., high and low centile HCPs). An algorithm can be executed across the database entries to optimize the distribution of customers in this manner, or to create a distribution within a specified threshold. Optionally, additional criteria can be incorporated into the algorithm. For example, a field representative's customers can be limited to a specified radius from their home or business office. Alternatively, it may be desirable not to alter highly successful field representative-customer relationships, and therefore the algorithm can be configured to preserve those relationships that surpass a specified threshold.

Some modifications can have a ripple effect that requires changes to data records in additional tables in the database server. Thus, at step 325, the database server optionally examines the data modifications that result from the modified customer association and determine whether data records located in tables not already copied into the workspace are affected. If all the data modifications are contained within the tables copied into the workspace, the database server can proceed to step 330. However, if data external to the workspace requires modification, the server proceeds to step 310 at which the additional tables (or their contents) are copied into the workspace, thereby not permitting the data modifications associated with the realignment to affect the database server tables until the appropriate time.

Optionally, reports can be generated at step 330 based on the proposed realignment created in the workspace. For example, reports can be used to illustrate the distribution of customers to field representatives. A report can further incorporate past performance data of a field representative to project future performance in the new alignment. Alternatively, a report can incorporate past customer (e.g., prescriber) performance to project future customer performance in the new alignment.

At step 340, a manager or other supervisor can evaluate the proposed alignment. The evaluation is preferably assisted by the report generated in step 330. Additionally, because success in many fields is dependent on the personalities of field representatives and customers, it may be desirable for a supervisor to evaluate the new alignment based on knowledge of specific personalities—a task for which computers are not well qualified.

Furthermore, the evaluation can be performed over several levels of corporate structure and/or management. For example, a director may perform the initial redistribution of customers by modifying the customer associations using an algorithm. The proposed alignment can be preserved in the workspace for further evaluation by additional parties. Managers can access the workspace and evaluate the customer associations for their managed field representatives, thereby providing their insight and knowledge of specific field representatives. The field representatives can also access the workspace to evaluate the associations, thus providing their insight and knowledge of particular customers.

At step 350, a determination can be made whether the realignment is acceptable and should be effectuated throughout the system. This decision can be automated or manual. For example, if the modifications to field representative-customer associations are made manually, an algorithm, such as the one describe above, can evaluate the proposed alignment to ensure certain variables are within a specified threshold. Alternatively, if the association modifications are automated by an algorithm, a manual review by a person, or group of persons, can ensure the algorithm did not create an association that is unacceptable due to variables for which the algorithm was not programmed.

If the proposed alignment is unacceptable, the process 300 can return to step 320 allowing the user, or the system, to make additional modifications to the proposed alignment. Alternatively, the process 300 can return to step 310 (as shown) and, in essence, restart the process of realignment by copying the necessary database tables into the workspace, thereby overwriting the tables that were previously copied 310, modified 320, and deemed unacceptable 350.

Thus, the workspace can be used as a testing area in a memory of a computer or server. Modifications to database records in the workspace have no impact on the database server or its behavior. However, the workspace has read access to the records, and, as described above, if modifications are necessary to data records that have not been copied into the workspace, those data records, and tables, can be replicated in the workspace on-demand. Thus, users of the system can make alterations to customer assignments and other data records and evaluate and test those alterations without requiring a full or partial shutdown of the system.

In preparation for distributing and activating the realignment through the system, each client receives a customer association-rule that enables it to access its newly assigned customer's records, and that restricts access to customer records that have been removed from its control by the realignment. The association-rule preferably includes an effective time. The effective time indicates when the new alignment will be effective. In this manner, the new alignment can be distributed ahead of time and to each client at a different time, but still take effect on every client at the same time.

At step 360, the server creates an association rule for each client. The association-rule can be identical at each client or individualized. Furthermore, it can be implemented in various ways. According to one implementation, database records are provided with fields indicating the start and end time for which the client can access those records. Start and end times can, for example, be specified in two separate fields (e.g., start-time and end-time) or in one field indicating the date range. Thus, each database query on the client can be limited to ensure the current date and time is within the effective time and this limit can be a system-set characteristic which is not accessible to the representative. In other words, the association rule can dictate which records can be retrieved on a given date, and can thereby preclude access to a record that is within the local database of a representative's client machine if the record concerns a customer that is not part of the active database alignment.

Alternatively, the association rule can include a database view. A database view is a virtual or logical table composed of the result set of a query. The view is not part of the database schema, but is a dynamic, virtual table computed or collated from data in the database. Views can hide the complexity of data by transparently partitioning the actual underlying table. Thus, each client database can be provided with a view into the database that identifies the data records (i.e., customers) to which it has access. A new view (i.e., a new association-rule) can be distributed to the client with an effective date and time. Once the effective time is reached the client will automatically switch to the new view. If the effective time at every client is identical, all clients will switch to the new view at the same time. Again, the association rule can provide a parameter to the representative's client machine which is not accessible to the representative, yet which is determined and provided centrally by an administrator with permissions and access rights that enable central realignment of a plurality of client machines to be triggered all at once, and free of a connection to the central server at the time of realignment.

The modified customer associations, association-rule and related data are distributed at step 370. Preferably, once the new alignment is approved 350 and the associations-rules generated 360, the new association-rule and any data records and/or customers that will be required by the new alignment that are not currently stored at the client, are downloaded to the client by the synchronization process during the client's next synchronization (e.g., new customers or customer data records for a new region). In other words, data records that were copied to the workspace and modified can be distributed as necessary to the clients. In addition, supporting, or secondary data-records, that were not altered by the realignment but are required by the client database, are also downloaded to the client. Thus, the client is not required to be aware of the realignment, when the data for the realignment is received, or when the realignment will occur until after the realignment has been approved and all corresponding data distributed to the client.

The database server is also preferably notified of the effective time. Process 300 illustrates the server as looping at step 380 until it is determined that the effective time has been reached. However, while a loop is possible, the database server of the present invention can be implemented to check for the effective time in many ways. For example "cron" or "at" timer can be used to wake up or execute a process when the effective time is reached.

Once the effective time is reached, the server preferably effectuates the new alignment on the server 390. Thus, at step 390 the server can merge the modified records in the workspace into the main tables of the database server. Alternatively, the database can replace the tables of the database server that were copied to the workspace with the modified copies that exist in the workspace. Thus, the database server can switch (e.g., respond to synchronization requests 170, process automated reports 140, and perform database maintenance 130, etc.) to the new alignment at the same effective time as the client databases.

Additionally, at the effective time, the client effectuates the modifications on the client database at step 395. The effectuation at step 395 can occur by activating the new database view. Alternatively, if the effective time is set in the database records, database queries can check the effective time against the actual date and time, thus effectuating the changes distributed to the client.

The changes can also be made effective in two or more phases. For example, multiple association rules can be generated, each having an associated effective time. Thus, as each effective time arrives, only the portion of the changes associated with that particular effective time are activated/effectuated in the database. Alternatively, a single effective time can be used to communicate two or more phases of changes. For example, if an effective time is designated at midnight on a particular day, it may be desirable to perform all deletions from the database at 11:59 PM on the previous day (i.e., at an offset of −1 minute from the effective time) and perform all updates and additions at midnight on the day of the effective time. Further phases of changes can be added by specifying additional effective time offsets.

It should be noted that there is no loss of data or downtime at the client databases throughout the process of realignment. Data records are not required to be removed from the client in order to activate the new alignment. Rather, the data can remain in the client database, but will appear to the user as having been deleted, because the new association-rule does not allow the user to access it. Furthermore, because the data is not deleted from the clients, it is not lost to the server. If data is entered at a client for a customer between the time of the last synchronization and the effective time, the server can synchronize (i.e., retrieve) the data that is no longer accessible to the client using the new association-rule, but was entered and not yet synchronized.

In the foregoing description, certain flow diagrams have been shown and processes described in relation to those flow diagrams which provide a reference for discussion purposes. In an actual implementation of the methods of the present invention, the steps can comprise event-driven routines that can run in parallel and can be launched and executed other than as shown by the simple depiction in the flow diagrams. In short, the particular order of the steps in the flow diagrams is illustrative of the invention, but not limiting of the various permutations that can be achieved in a given embodiment. Accordingly, it is the performance of the steps recited in the claims appended below which is pertinent, and not the order of operation of the steps themselves.

While the invention has been described in connection with a certain embodiment thereof and in relation to a particular environment, the invention is not limited to the described embodiments and environments but rather is more broadly defined by the recitations in the claims below and equivalents thereof.

We claim:

1. A method for realigning a database of a server and a database of a respective client among one or more of a plurality of clients, comprising the steps of:
   copying a subset of at least one table of the database server to a workspace, the workspace having a plurality of records;
   identifying a set of records among the plurality of records that are to be associated with the respective client after an effective time;
   modifying in the workspace the set of identified records so as to be newly associated with the respective client;
   creating an association-rule for the respective client defining the modified set of records as accessible by the respective client, the association-rule having a database view and the effective time;
   distributing to the respective client the association-rule and the newly associated records;
   after the distributing step, providing at the respective client a view of the database of the respective client while precluding access to the newly associated records until the effective time is reached; and
   realigning the database server with the database of the respective client at the effective time with the modifications to the set of records in the workspace,
   wherein the association-rule enables the respective client to access the newly assigned records.

2. The method of claim 1, further comprising the step of receiving approval of the modified set of records, and performing the distributing step in response to receiving approval.

3. The method of claim 1, further comprising the step of distributing to the respective client secondary data external to the workspace related to the modified set of records.

4. The method of claim 3, wherein the secondary data is retrieved from the database server.

5. The method of claim 1, further comprising the steps of:
   synchronizing the respective client with the server; and
   transmitting the newly associated records during synchronization.

6. The method of claim 1, further comprising the step of generating a report concerning the set of records modified in the workspace.

7. The method of claim 1, wherein the copy of the subset of the at least one table of the database server creates respective workspace tables, and the step of realigning the modifications to the set of records includes the step of merging the workspace tables into the respective database server table.

8. The method of claim 1, further comprising the steps:
   determining if the modifying step alters one or more secondary data records external to the workspace; and
   in response to the determination step, selectively copying the secondary data records into the workspace,
   wherein the modifying step alters the secondary data records in the workspace.

9. The method of claim 1, including the additional step of activating the association-rule at the effective time at the respective client.

10. A method for realigning data responsibility in a client-database server environment, comprising the steps of:
    copying a table from a database server to a workspace, the database server associating respective first sets of database records with respective clients, each having a client database;
    establishing a proposed realignment of database records for each respective client;
    creating in the workspace respective second sets of database records corresponding to respective proposed assignments;
    defining an association-rule for each respective client, the association-rule having a common effective time and a database view;
    distributing to each client the respective association-rule and second set of database records;
    after the distributing step, providing at the respective client a view of the database of the respective client while precluding access to the newly associated records until the effective time is reached, as dictated by the association-rule; and
    making effective the second association of the workspace table in the database server after the effective time, as dictated by the association-rule.

11. The method of claim 10, further comprising the step of receiving approval of the proposed assignment, and performing the distributing step in response to receiving approval.

12. The method of claim 10, further comprising the step of distributing to the respective client database at least one secondary data record related to the second set of data records.

13. The method of claim 12, wherein the secondary data is retrieved from the table of the database server.

14. The method of claim 10, further comprising the steps of:
    synchronizing the respective client with the server; and
    transmitting the data records associated with the associated second set during the synchronization.

15. The method of claim 10, further comprising the step of generating a report concerning the proposed realignment.

16. The method of claim 10, wherein the step of making effective the modifications of the workspace table includes the step of merging the workspace table into the database server table.

17. The method of claim 10, further comprising the steps:
    determining if the creating step requires alteration of a data record stored in a secondary table external to the workspace; and
    in response to the determination step, copying the secondary table into the workspace,
    wherein the creating step modifies data records in the secondary table.

18. The method of claim 10, including the additional step of activating the association-rule at the effective time at the respective client.

* * * * *